United States Patent [19]

Horton

[11] Patent Number: 5,083,660
[45] Date of Patent: Jan. 28, 1992

[54] REMOVABLY RETAINING PIVOT RODS IN MODULAR PLASTIC BELTS

[75] Inventor: Paul L. Horton, Metairie, La.

[73] Assignee: The Laitram Corporation, New Orleans, La.

[21] Appl. No.: 610,751

[22] Filed: Nov. 8, 1990

[51] Int. Cl.$^5$ .............................................. B65G 17/06
[52] U.S. Cl. ..................................................... 198/853
[58] Field of Search ................................. 198/851, 853

[56] References Cited

U.S. PATENT DOCUMENTS 4,949,838  8/1990  Lapeyre et al. ..................... 198/853

Primary Examiner—Joseph E. Valenza
Attorney, Agent, or Firm—Laurence R. Brown; James T. Cronvich

[57] ABSTRACT

Headless pivot pins in flexible plastic modular belts for pivoting modular sections are desirable, but pose a problem in that they must be retained axially in place as the belt is loaded and used, generally under tension. This invention provides pivot pin retention means of low construction and installation cost by means of swivelling an interdigital belt module member, preferably of integrally molded plastic material, from a movable toe end to move about a swivel joint at an opposite anchored heel end out of its retention position blocking the pivot pin axial movement. One embodiment of the invention provides for swiveling of an end plate member at the edge of the belt in a plane normal to the belt and pivot pin axis forcibly away from a biased rest position at least partially covering a pivot pin aperture. Another embodiment positions a journalled post in a pivot pin aperture at the edge of the belt for removal by forcibly overcoming a resilient bias, preferably derived from characteristics and structure of the belt module plastic material, to move the journalled post out of the aperture so that the pivot rod can move out. Thus, headless pivot rods are employed without additional belt parts by manual actuation in assembling the belt or removing pivot rods in a simple manner that reduces belt material and assembly costs.

22 Claims, 3 Drawing Sheets

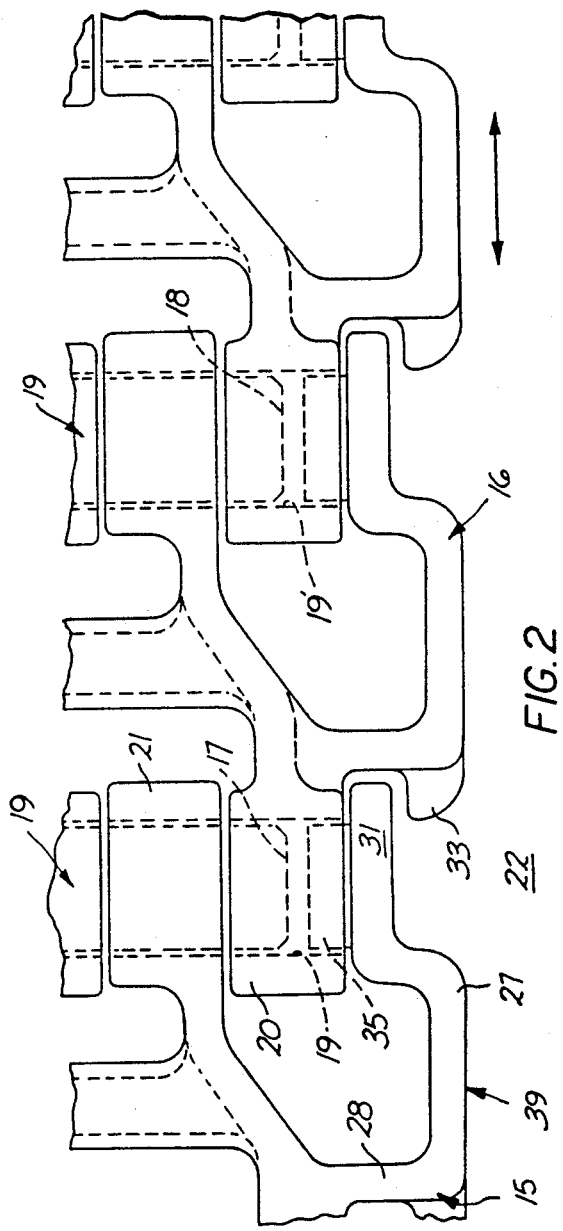
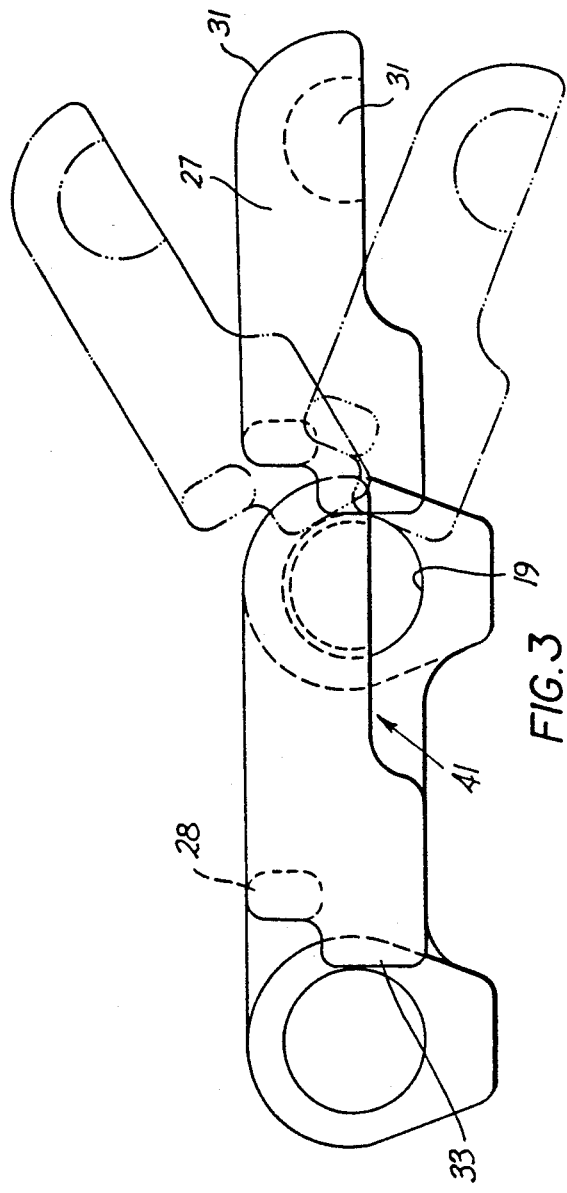

REMOVABLY RETAINING PIVOT RODS IN MODULAR PLASTIC BELTS

TECHNICAL FIELD

This invention relates to flexible modular belts in which adjacent modular sections are pivotably connected by means of pivot rods axially extending through a series of journalling apertures on interdigited members of the adjacent modular sections, and more particularly it relates to a system for retaining the pivot rods in position during normal operation of the belt while permitting pivot rods, particularly headless pivot rods, to be inserted and removed with facility.

BACKGROUND ART

It is known in the art that headless pivot rods may be used in flexible modular belts, preferably made of plastic modules connected together by the pivot rods. Such headless pivot rods however in normal belt usage and loading, generally under tension, must be retained to prevent axial movement out of position to interfere with optimal belt performance. Some solutions to this problem are disclosed in U.S. Pat. No. 4,858,753 to W. G. Hodlewsky, Aug. 22, 1989.

Thus, spring plugs are suggested, for example, forced into outer apertures alongside the belt edge. However, these plugs interfere with a smooth belt edge desirable to prevent wear when engaging sidewalls and the like. Also they represent added cost in forming extra belt parts which also require labor cost in assembly.

Alternative suggestions to leave the end apertures open without such plugs, require oblong inner belt journalling apertures different from end apertures. This adds construction costs and problems and is not always acceptable when it is desired to eliminate play in the modular interconnection joint at the pivot rod. Also it does not positively prevent headless pivot rods from entering end apertures and interfering with belt performance. Furthermore, particularly with narrow belts, the alternative use of the pivot rod journalling aperture in the end links eliminates the desirable positive journalled linkage coupling between modules of the critical end plate that may be in contact with side rails, for example.

In a copending application of the common assignee of this application U.S. Ser. No. 07/586,389 to J. M. Lapeyre for "Apparatus to Allow Non-destructive Removal of Pivot Rods in Modular Plastic Conveyor Belts" there is disclosed a pivot rod stopping member integrally molded as a tabular flexible extension on a plastic modular section belt edge member having enough resiliency to be forcibly moved out of its position blocking the journalling pivot pin apertures so that pivot pins cannot be entered or exited without bending the tabular extension out of the way. While this feature has considerable merit, it also removed the possibility of structural changes in the critical belt edge portion of the module including the option of a substantially continuous belt edge surface. Also the range of resilience of a tabular extension on firmly affixed module end structure limited the flexibility and accordingly the number of repetitive work cycles of life, the range of plastic materials, which might under some conditions be required to be stiff or "case hardened" for meeting other design criteria of a plastic belt, and imposed conditions that made it difficult to remove or enter pivot rods without considerable force or special tools.

Accordingly it is an object of this present invention to improve the state of the art by removing the aforesaid deficiencies, and to provide a self contained plastic modular belt assembly with fewer parts which positively retains pivot rods in their axial working position during normal use of the belt, but which facilitates ready "toolless" manual operation for belt assembly and pivot rod removal.

DISCLOSURE OF THE INVENTION

A flexible modular belt assembly, preferably plastic, which has a series of separate modular sections along the length of the belt secured together by means of pivot rods in interdigited members having axially aligned journalling apertures for the pivot rods in accordance with this invention may use headless pivot rods secured in place during normal belt use by a module element that can be manually flexed and displaced for entry and exit of pivot rods. Thus, a pivot rod retention plate on each modular belt section, similar in construction to an interdigited member on the module, extends toward the pivot rod axis to at least partly cover a journalling aperture to retain the pivot rod in place. The retention plate is affixed to the modular sections and biased to confine the pivot rod in its rest position but is arranged to swivel or flex far enough when forcibly displaced to permit the pivot rod to move axially into and out of the apertures.

This retention plate in a preferred embodiment is a belt edge plate on the module. Preferably the retention plate is substantially as long as the spacing between two successive aperture axes along the belt and has interlocking members cooperating with an adjacent retention plate on an adjacent module for restraining flexibility outwardly toward the belt edge when the belt is in a working posture. In a plastic module, the plastic material resiliency of a thin integrally attached mounting post at one retention plate end provides non-destructive flexibility for repetitively flexing and swiveling the plate out of place to remove or introduce pivot rods.

A belt edge retention plate can readily be produced for a smooth substantially uninterrupted belt edge profile with minimal spacings between the plates located on adjacent modular sections. The swivel motion of the retention plate from its biased rest position may be in a single plane perpendicular to the pivot pin axis in the simplest case. However, the retention plate can itself carry a rod section positioned for extending into an aperture for pivoting therein to produce positive intermodular coupling at the critical belt edge region. In this version, the retention plate swivels in a degree of motion that permits removal of the rod section from its aperture postion before moving the retaining member from a position blocking the pivot rod aperture position.

Other objects, features, advantages and details of the invention will be found throughout the following description, drawings and claims.

BRIEF DESCRIPTION OF THE DRAWINGS:

In the drawing, where similar reference characters identify similar features throughout:

FIGS. 2 and 3 are corresponding enlarged fragmental respective plan and belt edge views illustrating pivot rod confinement features afforded by this invention.

THE PREFERRED EMBODIMENTS

Figure 1:
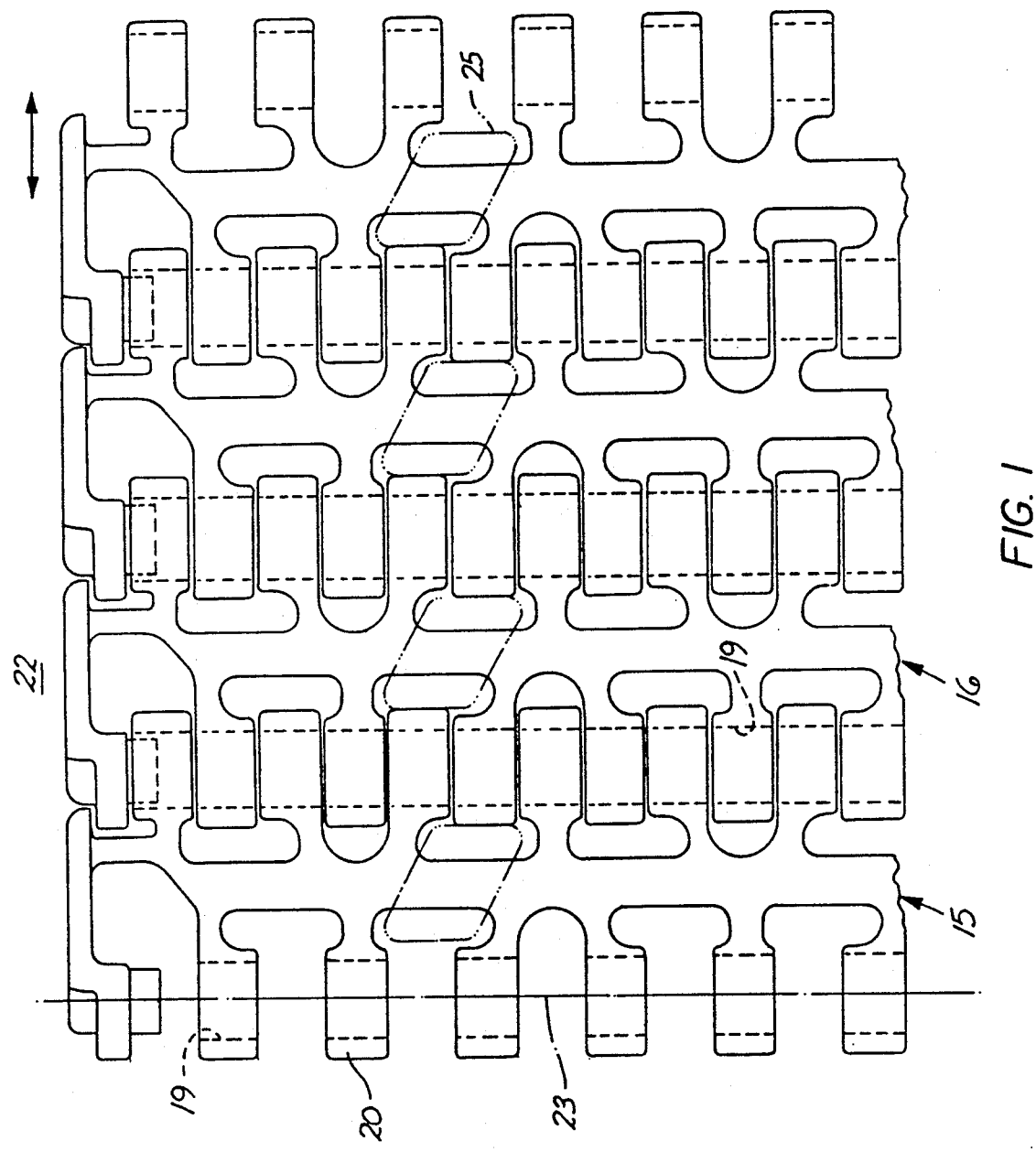
FIG. 1 is a plan schematic fragmental view of an embodiment of the invention including a belt edge portion of a flexible plastic belt having modular sections interconnected by pivot rods.

With reference to the embodiment of FIGS. 1 to 3, adjacent belt modular sections 15, 16 are connected together into a flexible modular belt assembly by means of pivot rods 17, 18 journalled in a series of pivot rod journalling apertures 19 positioned in the interdigited module fingers 20, etc., aligned along the pivot rod axes 23. The modular sections 15, 16, etc., have critical structure at an edge 22 of the belt assembly, which normally moves in the directions shown by the arrows by means of sprockets (not shown) engaging the belt at cog locations 25, or other equivalent means. Such belt edge structure in the form of end plates, for example, may frictionally engage side rails so that they may be required to carry a share of the belt work load.

This belt edge assembly is shown in enlarged detail in FIGS. 2 and 3. With headless pivot rods 17, 18, preferably used, retention means is necessary to prevent the pivot rods from axially moving outwardly from the belt edge during operation. In this embodiment of the invention the pivot rod retention plate member 27 is integrally molded on a respective modular section 15, for example, as an edge plate member of the belt assembly. By means of mounting post 28 the belt edge plate member 27 is movably retained upon the modular section 15 near the belt edge in a biased position under normal belt use to restrict the exit of pivot rod 17 from its position in the aligned apertures 19 in the interdigited members 20, 21, etc. The integral molding of post 28 on the plastic modular section 15 of polyethylene, polypropylene, or acetal provides enough flexibility and resilience along with retention and positioning strength at one end of the retention plate 27 to bias the other end 31 in place at least partly (FIG. 3, 41) over the aperture 19 to abut the interdigited finger 20 and thus block the pivot rod 17 from moving outwardly toward the belt edge 22, when in a normally disposed rest position retained as the belt moves in the direction of the arrows along its length.

The integrally affixed mounting post 28, which may constitute a substantially rectangular section, for example, also serves as a flexing swivel joint for permitting swivelled movement of the retention plate 27 from its normal rest position. In this embodiment the thinner dimension of post 28 permits flexing of the toe portion 31 of the retention plate member 27 axially outwardly away from the pivot rod 17. Also the retention plate 27 may move, as shown in FIG. 3, in a plane perpendicular to the axis (23) of the pivot rod 17 so that it no longer blocks the entrance-exit way aperture 19 through which the pivot rod 17 passes. In this mode of flexure the post 28 substantially acts as a torsion bar. By reducing the width of the end 31 defining the pivot pin retaining member at the toe end portion (41), the necessary swivel angle for uncovering the pivot pin aperture 19 is reduced.

The length of the retention plate end panel 27 along the travel path of the belt is substantially that of the spacing between two successive aperture positions 19, 19' in the belt. Interlock tabs 33 are provided at the heel end of the retention plate where post 28 holds it firmly in position with respect to the rest of the modular section 16 to which it is attached. Thus the movement of the toe end 31 of the retention plate 27 on modular section 15 cannot move outwardly in the normal use of the belt if forced by axial outward movement of the pivot rod 17. However, it is noted that the tab 33 does not retain the toe end 31 of retention plate 27 if the modules are pivoted about the pivot rod at an angle greater than that encountered in normal belt operation such as going around a pulley or drive sprocket.

For reinforcing the stiffness of the belt edge portion 22 and preventing any tendency for the retention plate member 27 to flex longitudinally out of position in a direction along the belt because of forces encountered in use and under load, and for improving the coupling strength between the modules as provided by the pivoting means, the extension rod section 35 is formed as a pivot rod blocking pin part of the retention plate member 27 for extending into aperture 19 and being journalled pivotably therein. For such embodiments, the mounting post 28 is constructed by dimensioning, etc. for compound swivelling including a direction permitting the retention plate 27 to be forcibly moved axially away from the aperture position far enough to remove the journalled rod section 35 from the aperture before swivelling in a different direction to remove the toe end of the retention plate 27 out of its retention position blocking the pivot pin 17.

The retention plate 27 on the belt edge surface 39 presents a substantially smooth surface extending along the length of the belt that can abut and frictionally slide against guide rails and the like with little interference or wear without any sacrifice of the functional performance of retention of the pivot rods 17, etc. in place.

Figure 4:
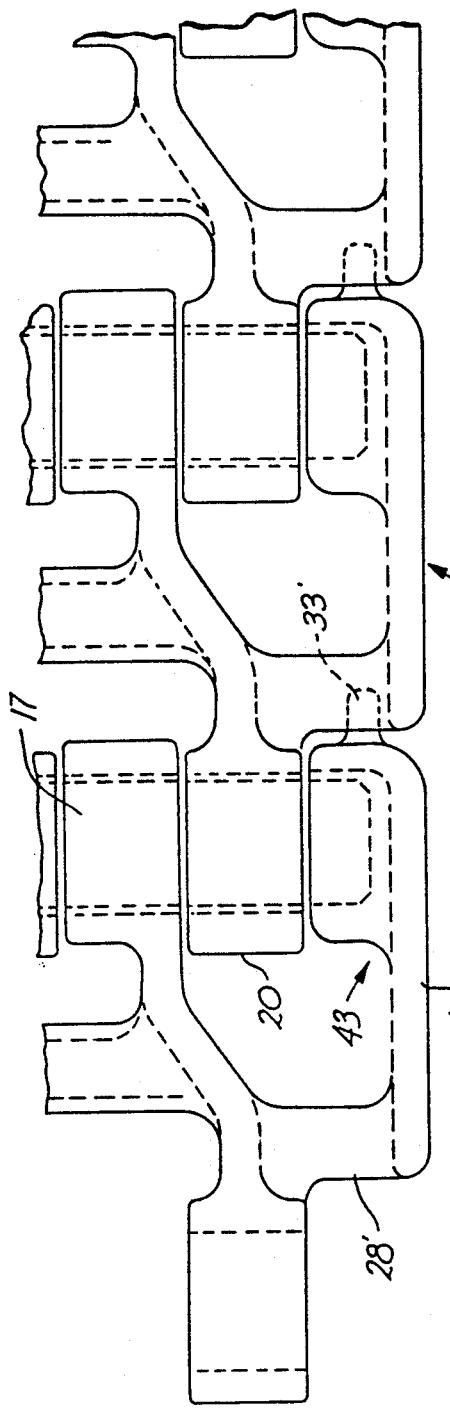
FIGS. 4 and 5 are respectively fragmental plan and belt edge views illustrating a further flexible modular belt assembly embodiment of the invention.
Figure 5:
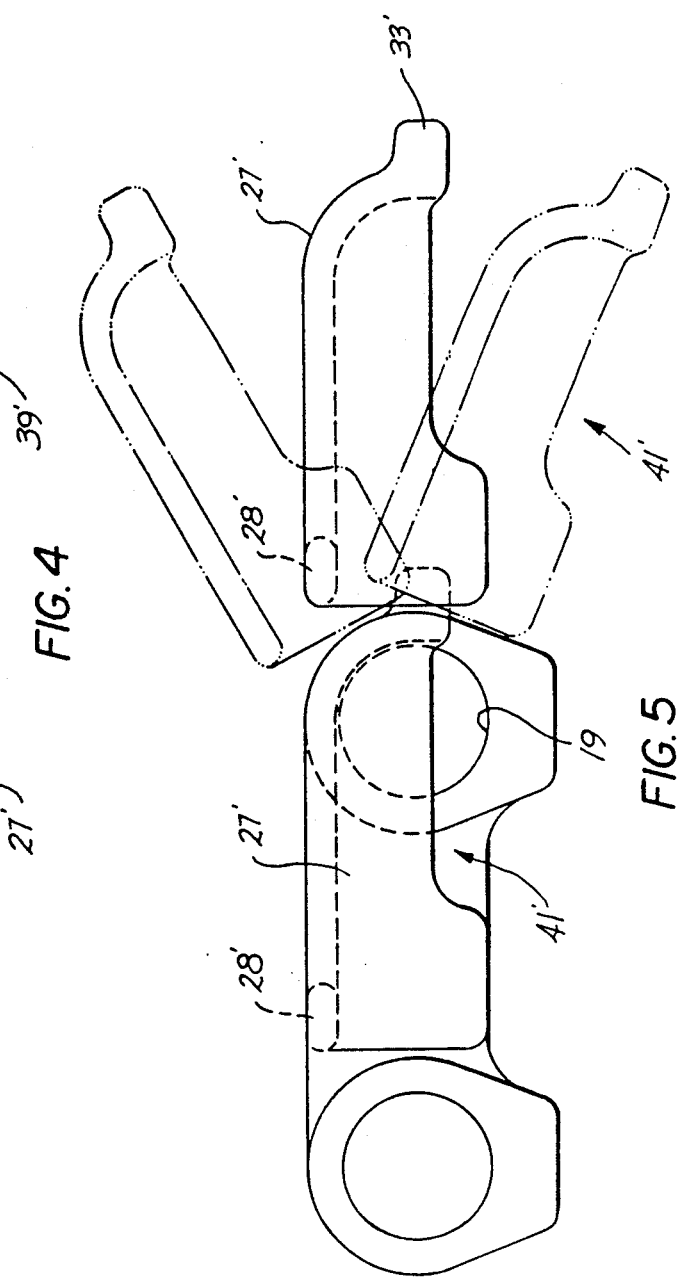

In the simplified embodiment of FIGS. 4 and 5, the retention plate member 27' is an edge panel end plate at the edge of the belt and presents a substantially uninterrupted linear smooth edge surface 39' with minimal spacing gaps. The corresponding features of interlocking tab 33' and mounting post 28' are shown. Note from FIG. 5 that a torsion bar effect is produced by the substantially rectangular mounting post 28' as the retention plate member is swivelled in a plane perpendicular to the belt and pivot rod axis. Also, the feature of limiting the necessary swivel angle required to uncover aperture 19, by reducing the width of the toe end of the retention plate member 27' at 41' to cover only a segment of the aperture 19 in its biased rest position is retained. In this embodiment the retention "plate" member has a retainer cap 43 on the working surface side of the belt assembly that abuts the interdigital member 20 and permits the pivot rod 17 to extend entirely through the belt-edge-most aperture 19 for fully journalled pivoting so that the feature of retaining belt edge pivoting is an advantage over any prior art systems that leave the outermost aperture (19) open or plugged with a removable resilient retainer plug. Furthermore, in its biased rest position, retention plate member 27' is prevented from swivelling due to belt motion by the opposing blocking effects of the pivot rod 17 on the retainer cap 43 and the adjacent retention plate members mounting post on the interlocking tab 33'.

It is seen from the foregoing that this invention has provided novel flexible belt assemblies that resolve prior art problems and operate more reliably while also unexpectedly providing lower material costs and assembly costs. Accordingly those novel features defining the spirit and nature of the invention are set forth with particularity in the following claims.

I claim:

1. A flexible modular belt assembly wherein a series of separate modular sections along the length of the belt have interdigited members pivotably secured together by means of pivot rods located at a plurality of aperture positions in the interdigited members positioned along the length of the belt assembly each position presenting a plurality of apertures respectively located in a plurality of interdigited members on adjacent modular sections with the apertures axially aligned along a pivot rod axis for retention of a pivot rod, comprising in combination, a plurality of modular sections interconnected by said pivot rods into a belt assembly to define at least one belt edge, pivot rod retention plate means retained movably upon said modular sections near the belt edge in a biased position to restrict the exit of pivot rods from the aligned apertures in the interdigited members during normal movement of the belt along its length by means of individual retaining members located on the plate means when positioned in a normally disposed rest position to at least partly cover the aperture positions along the length of the belt as it moves along its length, swivel means for affixing said retention plate means to the modular sections for swivelled movement of the retention plate means away from a first normally biased said normally disposed rest position with said retaining members into a further said swivelled position when forcibly removed from its biased rest position for uncovering a corresponding aperture position thereby permitting a pivot rod to move axially into and out of the apertures at said corresponding aperture position when the retention plate means by way of said swivel means is forcibly moved out of said rest position, and axial movement prevention means for restricting movement of the retention plate means away from the pivot rod only when the adjacent modular sections are in a coplanar relationship for use of the belt.

2. The belt assembly of claim 1 wherein the retention plate means comprises an end panel of a length disposed along the edge of the belt substantially that of a spacing between two successive aperture positions in the belt.

3. The belt assembly of claim 1 wherein said swivel means comprises a mounting post of elastically flexible material located at a position near one end of the retention plate means.

4. The belt assembly of claim 1 wherein said modular sections consist of plastic moldings of a plastic material that integrally produces from a thin substantially rectangular cross section post of the plastic material a nondestructive elastic flexibility to the swivel means well adapted for repetitive swivelling.

5. The belt assembly of claim 1 wherein the swivel means is constructed for repetitive swivelling of the retention plate means in a plane perpendicular to the pivot rod axis.

6. The belt assembly of claim 1 wherein the swivel means is constructed for repetitive swivelling in a direction permitting the retention plate means retaining members to move axially away from said aperture position.

7. The belt assembly of claim 1 wherein the retention plate means comprises a substantially planar smooth belt edge surface end plate extending along the length of the belt.

8. The belt assembly of claim 1 wherein the said movement prevention means comprises interlocking means integrally affixed to said retention plate means resident on two adjacent modular sections overlapping two adjacent said retention plate means for prevention of retention plate means movement away from the pivot rod only during normal belt movement in a planar relationship.

9. The belt assembly of claim 1 wherein the retaining members comprise a rod section positioned for extending into an aperture at said aperture positions to pivot therein.

10. The belt assembly of claim 9 wherein said swivel means is constructed to permit movement of the retention plate means in a degree of motion that removes the rod section from its aperture before moving said retention means from a position blocking the pivot rod aperture position.

11. The belt assembly of claim 1 wherein the modular sections and retention plate means are plastic, and said swivel means comprises a plastic post integrally connecting the retention plate means to a module wherein the post has enough residual resilience and strength to retain the retention plate means in place while permitting repetitive swivelling of said swivel means when necessary.

12. The belt assembly of claim 1 including swivel means structure permitting forceful movement of the retaining members into said swivelled position permitting the pivot rod to move axially into and out of the apertures by movement of the retention plate means in a plane perpendicular to the pivot rod axis.

13. The belt assembly of claim 1 including retention plate means structure requiring movement of the retaining members into said second position to permit the pivot rod to move axially into and out of the apertures, said movement into said second position requiring the retention plate means to move out of a plane in which it normally rests.

14. The belt assembly of claim 1 wherein said movement prevention means comprises interlocking structure overlapping two adjacent retention plate means residing in adjacent modular sections for restricting movement of the retention plate means out of a plane in which it rests unless the interlocking structure is moved out of interlocking position in order to permit a pivot rod to move axially out of the apertures.

15. The belt assembly of claim 14 wherein the interlocking structure is positioned in an interlocking position with the belt assembly disposed in a normal operative position and has interlocking structure that moves out of interlocking position when two adjacent modules are pivoted about said pivot pins beyond said normal operative position.

16. The belt assembly of claim 1 wherein said retention plate means covers only a segment of the aperture position thereby providing a reduced swivel angle required to move the retaining member out of its biased rest position to permit axial displacement of the pivot rod.

17. A flexible belt assembly having disposed along its length a plurality of integrally molded pivotable plastic modular belt sections connected together by means of pivot rods, comprising in combination, retention plate structure carried by each of the modular belt sections longitudinally disposed along the length of the belt, said modular sections defining two rows of interdigital apertured members aligned axially in a direction perpendicular to a direction of belt travel operatively serving as journalling means for said pivot rods, covering means on one longitudinal end of said retention plate structure positioned to at least partially cover a belt aperture in one of the two rows for restricting therein axial movement of a pivot rod, mounting means affixing the retention plate structure to its respective modular section consisting of resilient plastic means molded into the modular sections and located at an end of the retention plate structure opposite to the covering means end for permitting the retention plate to move in at least one planar direction of movement into a position uncovering a belt aperture to permit axial movement of said pivot rod, and further comprising at least one interlocking member on said retention plate structure for engaging an adjacent retention plate structure on a different modular section in a belt array formed of at least two said modular sections to limit relative movement of the retention plate structure in a direction perpendicular to a pivot rod axis only when the adjacent modular sections are coplanar.

18. The belt section of claim 17 wherein said covering means comprises a plug member for journalling into an interdigital apertured member.

19. The belt section of claim 17 further comprising means mounting said at least one interlocking member in a position for moving out of interlocking position when two adjacent belt sections are pivoted about a pivot rod axis at an angle exceeding any encounted in normal travel of the belt, thereby to permit a pivot rod to be removed from said interdigited apertured members.

20. The belt assembly defined in claim 17 wherein the covering means covers only a segment of the belt aperture thereby to reduce the movement of the retention plate structure necessary to uncover the belt aperture and permit pivot rods to be introduced and removed.

21. In a modular flexible belt assembly, a pivot rod retention system for retaining a pivot rod positioned along a pivot rod axis with limited axial movement while a modular flexible belt having a plurality of modular units coupled together with pivot rods is moving, each pivot rod being aligned along said pivot rod axis as defined by a series of axially aligned journalling apertures respectively positioned in a plurality of interdigited members extending from the modular units, comprising in combination, a pivot pin blocking plug for preventing axial movement of a pivot rod outwardly from an edge of the belt carried by a belt edge plate member on the modular units inserted into and journalled for pivoting in said journalling apertures disposed near the edge of the belt, and positioning means for removably holding the plugs in place in a normal journalled position in the respective said apertures to permit entry and exit of pivot rods in said series of apertures.

22. The retention system of claim 21 wherein the positioning means further comprises integral structure in said belt edge plate member for biasing the belt edge plate member in a rest position from which it may be forcibly moved, and further comprising resilient means integrally affixing the belt edge plate member to a first modular unit by a resilient joint that permits the belt edge plate member to be swivelled for removing said plug form said normal position, and wherein said plug comprises an integral part of the belt edge plate member of a length that can be forcibly removed from its journalling aperture and position preventing axial movement of the pivot rod.

* * * * *